United States Patent
Ko et al.

(10) Patent No.: US 12,081,678 B2
(45) Date of Patent: Sep. 3, 2024

(54) SECURE AUTHENTICATION USING ATTESTATION TOKENS AND INVIOLABLE QUOTES TO VALIDATE REQUEST ORIGINS

(71) Applicant: Microsoft Technology Licensing, LLC, Redmond, WA (US)

(72) Inventors: Richard Pakhang Ko, Kirkland, WA (US); Eric Arnold Jenkins, Jr., Bellingham, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

(21) Appl. No.: 17/508,842

(22) Filed: Oct. 22, 2021

(65) Prior Publication Data

US 2023/0131060 A1    Apr. 27, 2023

(51) Int. Cl.
*H04L 9/32* (2006.01)
*G06F 9/451* (2018.01)
(Continued)

(52) U.S. Cl.
CPC ............ *H04L 9/3263* (2013.01); *G06F 9/451* (2018.02); *H04L 9/3213* (2013.01);
(Continued)

(58) Field of Classification Search
CPC ..... H04L 9/3263; H04L 63/04; H04L 63/166; H04L 9/3247; H04L 63/0442;
(Continued)

(56) References Cited

U.S. PATENT DOCUMENTS 8,015,599 B2    9/2011 Popp
9,521,125 B2   12/2016 Schulz
(Continued)

OTHER PUBLICATIONS

Beswick, James, "Introducing mutual TLS authentication for Amazon API Gateway", Retrieved from: https://aws.amazon.com/blogs/compute/introducing-mutual-tls-authentication-for-amazon-apigateway/, Sep. 17, 2020, 9 Pages.
(Continued)

*Primary Examiner* — Mohammad A Siddiqi
(74) *Attorney, Agent, or Firm* — Weaver IP L.L.C.

(57) ABSTRACT

Secure authentication using attestation tokens and inviolable quotes to validate request origins is performed by systems and platforms. An application programming interface (API) service is hosted via secure enclave of a computing platform container. Requests to a resource system for highly confidential/sensitive information persisted in a data storage, or for computational services, are made through the enclave, which is a source from which requests are trusted. An API call is made from the secure enclave to the resource system to establish a secure communication session based on a signed certificate for the secure enclave that is signed using an encrypted memory of the secure enclave. The API call also includes an attestation token used to validate the secure enclave as the source requesting the information or service via the API call. Confidential/sensitive information is provided to the secure enclave if the API call source is validated by the resource system.

20 Claims, 6 Drawing Sheets

(51) Int. Cl.
   *H04L 9/40* (2022.01)
   *H04L 29/06* (2006.01)
(52) U.S. Cl.
   CPC ........ *H04L 9/3247* (2013.01); *H04L 63/0442* (2013.01); *H04L 63/166* (2013.01)
(58) Field of Classification Search
   CPC ... H04L 63/06; H04L 63/0823; H04L 9/3213; G06F 21/53; G06F 9/451; G06F 21/57; G06F 21/602
   See application file for complete search history.

(56) References Cited

U.S. PATENT DOCUMENTS

| | | | |
|---|---|---|---|
| 10,592,670 | B2 | 3/2020 | Poornachandran et al. |
| 10,917,243 | B2 | 2/2021 | Meriac |
| 2003/0221100 | A1* | 11/2003 | Russ .................. H04L 12/2805 713/153 |
| 2004/0052377 | A1* | 3/2004 | Mattox .............. H04N 21/4623 348/E7.056 |
| 2018/0212939 | A1 | 7/2018 | Costa |
| 2019/0065406 | A1 | 2/2019 | Steiner et al. |
| 2021/0044976 | A1* | 2/2021 | Avetisov ............. H04L 63/0815 |
| 2021/0092604 | A1* | 3/2021 | Fox ....................... B64C 39/024 |
| 2021/0182806 | A1* | 6/2021 | Ornelas ..................... H04L 9/50 |
| 2021/0385066 | A1* | 12/2021 | Hearn ..................... G06F 21/62 |
| 2022/0108026 | A1* | 4/2022 | Ortiz ..................... G06F 21/602 |
| 2022/0158846 | A1* | 5/2022 | Ray ....................... H04L 63/126 |
| 2022/0329584 | A1* | 10/2022 | Sharma ................ H04L 9/3263 |
| 2023/0086191 | A1* | 3/2023 | Jakobsson ............ H04L 9/3231 705/66 |
| 2023/0289787 | A1* | 9/2023 | Sykora ............. G06Q 20/40145 705/71 |

OTHER PUBLICATIONS

Han, et al., "Toward Scaling Hardware Security Module for Emerging Cloud Services", In Proceedings of the 4th Workshop on System Software for Trusted Execution, Oct. 27, 2019, 6 pages.

Knauth, et al., "Integrating Intel SGX Remote Attestation with Transport Layer Security", In Repository of arXiv:1801.05863v2, Jul. 26, 2019, 14 Pages.

Nakatsuka, et al., "PDoT: Private DNS-over-TLS with TEE Support", In Proceedings of the 35th Annual Computer Security Applications Conference, Dec. 9, 2019, 11 Pages.

Shepherd, et al., "Establishing Mutually Trusted Channels for Remote Sensing Devices with Trusted Execution Environments", In Proceedings of the 12th International Conference on Availability, Reliability and Security, Aug. 29, 2017, 10 Pages.

Silva, et al., "Squad: A Secure, Simple Storage Service For Sgx-based Microservices", In Proceedings of the 9th Latin-American Symposium on Dependable Computing (LADC), Nov. 19, 2019, 13 Pages.

Gowda, et al., "Confidential Containers on Azure", Retrieved From: https://docs.microsoft.com/en-us/azure/confidential-computing/confidential-containers, Dec. 3, 2021, 7 Pages.

Gasmi, et al., "Beyond Secure Channels", In Proceedings of the ACM workshop on Scalable trusted computing, Nov. 2, 2007, 11 Pages.

Knauth, et al., "Integrating Remote Attestation with Transport Layer Security", In repository of arXiv:1801.05863, Jan. 17, 2018, pp. 1-14.

"International Search Report and Written Opinion Issued in PCT Application No. PCT/US22/041439", Mailed Date: Dec. 13, 2022, 13 Pages.

* cited by examiner

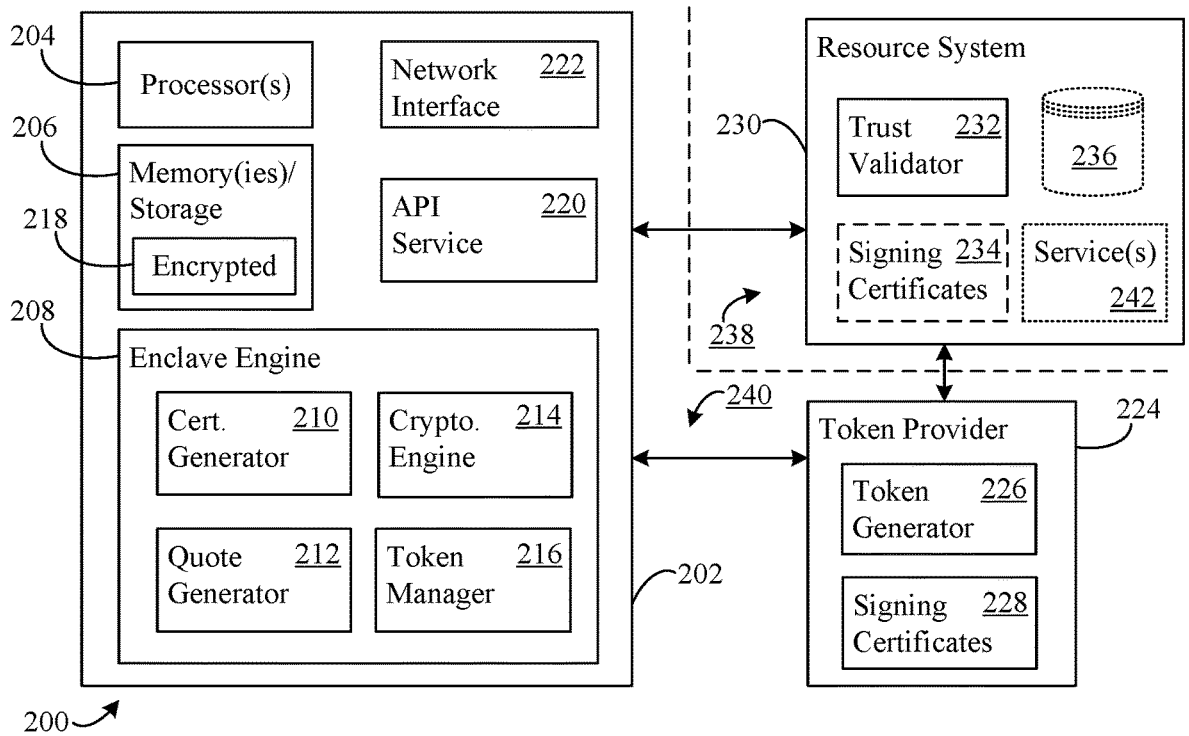

FIG. 2

Make an API call from a secure processing system to a resource system, the API call including a self-signed certificate of the secure processing system and an attestation token that is provided based at least on a secure quote of the secure processing system ⟵302

Provide confidential information from the resource system to the secure processing system responsive to the API call subsequent to a determination, based at least on the self-signed certificate and the attestation token, that the secure processing system is a trusted requestor ⟵304

SECURE AUTHENTICATION USING ATTESTATION TOKENS AND INVIOLABLE QUOTES TO VALIDATE REQUEST ORIGINS

BACKGROUND

When secure or sensitive services and data are accessed in networks, transport layer security (TLS) certificates may be stored and leveraged to authenticate requestors in secure sockets layer (SSL) sessions. Stolen TLS certificates and keys, however, lead to risks for abuse of these services and unauthorized access to data because the requestor cannot be validated beyond ownership of the certificate. Additionally, service outages and lack of data access due to expired certifications, as well as errors during certificate rotations, can occur.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Secure authentication using attestation tokens and inviolable quotes to validate request origins is performed by systems and platforms. An application programming interface (API) service is hosted in a secure enclave of a container in a computing platform. Requests for highly confidential/sensitive data and/or information persisted in a resource system, or for computational services, are made through the enclave, which may be the only source from which requests are trusted. Signed certificates are generated in the secure enclave and are signed using a private key of a key pair in an encrypted memory thereof. The secure enclave also generates secure quotes that include the public key of the key pair, using the encrypted memory, for acquiring an attestation token. An attestation service generates an attestation token for the secure enclave based on a hashed value of the public key in the secure quote. An API call is made from the secure enclave to the resource system to establish a secure communication session based on the signed certificate for the secure enclave. The API call also includes the attestation token that is used to further validate the secure enclave as the trusted source requesting the information or service via the API call. Confidential/sensitive data and/or information is provided to the secure enclave for provision to the requestor if the API call source is validated by the resource system.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 shows a block diagram of a computing system configured for secure authentication using attestation tokens and inviolable quotes to validate request origins, according to an example embodiment.

FIG. 3 shows a flowchart for secure authentication using attestation tokens and inviolable quotes to validate request origins, in accordance with an example embodiment.

Figure 1A:
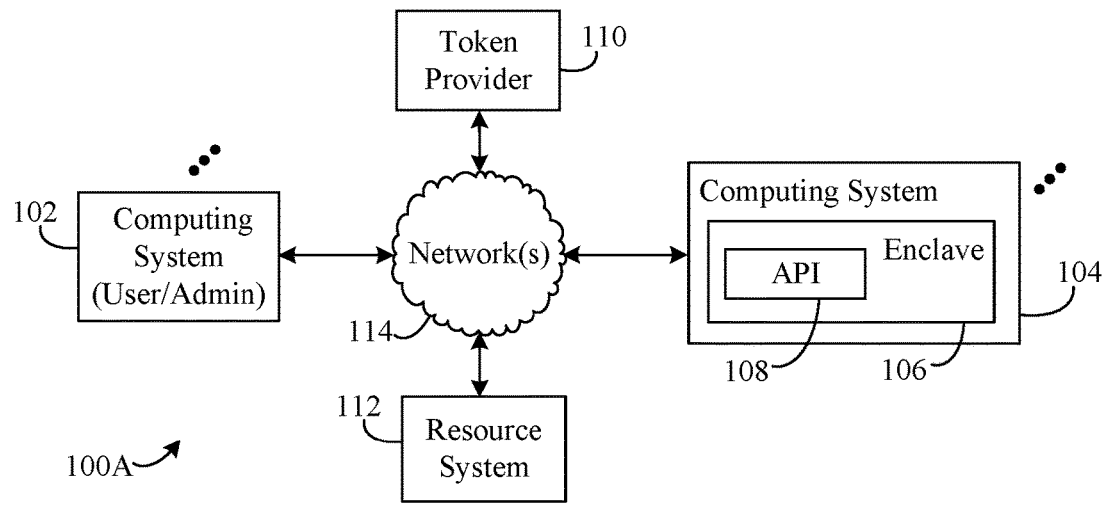
FIG. 1A shows a block diagram of a system for secure authentication using attestation tokens and inviolable quotes to validate request origins, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for secure authentication using attestation tokens and inviolable quotes to validate request origins. Section III below describes example computing device embodiments that may be used to implement features of the embodiments described herein. Section IV below describes additional examples and advantages, and Section V provides some concluding remarks.

II. Example Embodiments for Secure Authentication using Attestation Tokens and Inviolable Quotes to Validate Request Origins Methods for secure authentication using attestation tokens and inviolable quotes to validate request origins, are performed by systems and platforms, such as cloud platforms. Accordingly, embodiments herein may be directed to client/user systems, server systems, server clusters, cloud networks/platforms, enterprise networks, and/or the like, including but not limited to, portions thereof such as secure enclaves utilized in the handling of sensitive and/or encrypted information.

As referred to herein, a secure enclave (also "enclave") is a protected region or space comprising processing hardware and memory, e.g., in a network or cloud platform. In embodiments, a secure enclave is implemented via a secure, encrypted memory, associated with a processor or processor system (or a portion thereof), which acts as, i.e., comprises in described embodiments, a secure enclave (also as a trusted sub-environment), for retrieving and handling confidential/sensitive data and information. That is, a secure enclave may appear as a "black box" or "secured box" to the rest of the processing device/system, and thus to the rest of the network or cloud platform. In other words, secure enclaves prevent the viewing of any data, information, code, processes performed, etc., inside the secure enclave from the outside, even with a debugger or administrative permissions on the processing device/system. For instance, if untrusted code attempts modification(s) to the content in a secure enclave memory, the environment may be disabled and the operations are denied to prevent unauthorized access(es).

Additionally, in this description, the term "secure enclave" is intended to include all equivalent structures and/or mechanisms that provide the same or similar functionality for data processing, in embodiments, including but without limitation, processors and/or processor systems such as Intel® processors with Software Guard Extension (Intel® SGX) from Intel Corp. of Santa Clara, CA, which may be implemented in a cloud platform such as Azure® from Microsoft Corp. of Redmond, WA In some specific embodiments, certain types or implementations of secure enclaves may be contemplated, e.g., implementation via a secure, encrypted memory, associated with a processor or processor system (or a portion thereof) as noted above.

Secure enclaves may be configured to operate with applications and/or virtual machines (VMs), in embodiments, and may be utilized in conjunction with an application programming interface (API) service. The API service may be hosted by a secure platform or tool of a trusted computing base that runs on a confidential container, which executes the API service in a secure enclave for communications with a resource system that relies at least on attestation tokens to validate API calls are from the trusted computing base (e.g., a secure enclave). A resource system herein may comprise a data storage, a computational service, another type of privileged functional service, and/or the like. In embodiments, this may include, without limitation, retrieving and handling of confidential/sensitive data and information from a data storage via an API call, as described herein, provision of encrypted data via an API call to a computational service for decryption and return, and/or the like. In this way, the data storage is enabled to conclusively validate that the incoming request came from a trusted, and expected, source, and likewise, a computational service can verify a request for decryption of sensitive data is from a trusted, and expected, source. While some examples herein are provided and described for secure data storage, it is contemplated that embodiments are not so limited and may be applied to computational services, as would be understood by one of skill in the relevant art(s) having the benefit of this disclosure.

For instance, embodiments enable an on-premise data storage that persists confidential/sensitive and/or information to validate that an application programming interface API call made by the API service for access to the information is from a trusted party, e.g., in a cloud platform. In such an implementation, an API service is hosted in a secure enclave of a container in a cloud computing platform where requests for the confidential/sensitive information and/or data in the data storage are made through the secure enclave. In embodiments, the secure enclave may be the only source from which API calls that request the information are trusted. The secure enclave generates a signed certificate that is signed using a private key of a key pair stored in an encrypted memory of the secure enclave. The secure enclave also generates secure quotes that include the public key of the key pair, using the encrypted memory, for attestation token issuance by an attestation service (also a "token provider" or "trusted token provider" herein that is configured to generate and/or provide attestation tokens). That is, the aspects described herein contemplate that forms of a "token provider" are configured to generate and/or provide attestation tokens, according to embodiments.

The attestation service generates the attestation token for the secure enclave that includes a hashed value of the public key in the secure quote. The API call is made from the secure enclave to the data storage to establish a secure communication session based on the signed certificate for the secure enclave. The API call also includes the attestation token that is used to further validate by the data storage that the secure enclave is the trusted source requesting the information/data via the API call. The confidential/sensitive data and information can be provided to the secure enclave for provision to the requestor if the API call source is validated by the data storage.

Likewise, embodiments for computational services are similarly enabled where the API call includes encrypted data that can be decrypted and returned to the caller once the caller is validated via the mechanisms described herein. That is, while retrieving sensitive information/data from a secure data storage (e.g., an on-premise data storage as described in embodiments) differs in some aspects from providing encrypted data for decryption by a computational service, the underlying ability to determine that the API caller, such as a secure enclave, is a trusted and expected API call source may be common to both aspects.

The embodiments herein provide for increased and more robust security for secure or sensitive information and/or data, including but not limited to, payment information such as credit card numbers, identifying information of individuals, medical records, etc., by enabling the data storage that persists the information/data to conclusively verify that the requestor of the data is trusted, as well as being the expected requestor. The combination of inviolable quotes and protected, inaccessible keys produced via the secure enclave, attestation tokens from a known and trusted attestation service, and the ability of the secure enclave to decrypt and re-encrypt received secure or sensitive information and/or data for provision to a requestor without exposing the information and/or data enable authentication for and protection of information and/or data in ways that prevents theft thereof and unauthorized access thereto, even if administrative access to the specific computing device hosting the secure enclave is achieved.

Accordingly, the embodiments herein provide for solutions to issues associated with confidential/sensitive data and/or information access using quotes, certificates, and attestation tokens, and further enable the ability to validate data/information request origins. These and other embodiments for secure authentication using attestation tokens and inviolable quotes, will be described in further detail herein in association with the Figures, and in the Sections/Subsections of description that follow below.

Systems, devices, and apparatuses may be configured in various ways for secure authentication using attestation tokens and inviolable quotes to validate request origins. For instance, FIG. 1A is a block diagram of a system 100A, according to embodiments. System 100A is configured for secure authentication using attestation tokens and inviolable quotes to validate request origins, according to embodiments. As shown in FIG. 1A, system 100A includes an external computing system 102 of a user, administrator, etc., a computing system 104, a token provider 110 (e.g., an attestation service), and a resource system 112.

In embodiments, external computing system 102, computing system 104, token provider 110, and resource system may be enabled to communicate with each other over a network 114. It should be noted that various numbers of computing systems and/or components may be present in various embodiments. Additionally, any combination of the components illustrated in FIG. 1A may be present in system 100A, according to embodiments.

Network 114 may comprise any number and/or type of communication links that connect computing devices and hosts/servers such as, but not limited to, the Internet, wired or wireless networks and portions thereof, point-to-point connections, local area networks, enterprise networks, and/or the like.

In embodiments, resource system 112 provides its service (e.g., access to a data storage or computational service) only when it has authenticated the API caller via an attestation token. For instance, resource system 112 may be called via API by an enclave of computing system 104 (as described in further detail below) for access, and may communicate with token provider 110, as an attestation service, to obtain signing certificates necessary to validate the attestation token from the enclave of computing system 104. Computing system 104, via its enclave, may generate a TLS certificate and a secure quote containing the hashed public key of the certificate, and may provide the secure quote to token provider 110 to obtain the attestation token containing the secure quote data. Computing system 104 may then generate/place the API call, having the attestation token, the TLS certification, and/or any API-specific information to resource system 112. Token provider 110 (as an attestation service) may generate and provide the attestation token when requested by computing system 104 via its enclave, and may also provide signing verification certificates to resource system 112 when requested, as noted above.

For instance, resource system 112 may be an internal/external storage device(s), storage system(s), etc., and may comprise an external, on-premise server associated with computing system 104, may be a computational service, as described herein, hosted by network-, cloud-, and/or on-premise hardware, and/or another type of privileged functional service, in embodiments, as exemplarily illustrated. Resource system 112, for data storage embodiments, may be configured to securely and persistently store confidential/sensitive data and/or information which may be persisted in an encrypted state thereby, such as credit card numbers, identifying information of individuals, medical records, etc., in embodiments, and may be configured to authenticate or allow access to the confidential/sensitive data and/or information based on certain signed certificates and attestation tokens in API calls, as described herein, which definitively identify a specific requestor that is trusted. Additional description regarding details and functions for embodiments associated with data storage, such as resource system 112, are provided herein below. In computational service embodiments, resource system 112 may be configured to decrypt and return data that is provided thereto in an encrypted state via an API call, as described herein.

External computing system 102 and computing system 104 may each comprise one or more server computers or computing devices, which may include one or more distributed or "cloud-based" servers, including being ones of a server cluster. In embodiments, external computing system 102 may be a third-party device, including personal or work-based devices (e.g., any number, type, or combination of computing devices or computing systems, including a terminal, a personal computer, a laptop computer, a tablet device, a smart phone, a personal digital assistant, a server(s), a gaming console, and/or the like, including internal/external storage devices, etc.), which is utilized to access, or attempt to access, computing system 104. In embodiments, such access may be for confidential/sensitive data and/or information, as described herein. Computing system 104 may be associated with, or may be a part of, a cloud-based service platform such as Microsoft® Azure® from Microsoft Corporation of Redmond, WA In some embodiments, external computing system 102 and/or computing system 104 may comprise on-premise computing devices/servers and/or storage devices/systems in addition to, or in lieu of, cloud-based implementations. Various systems/devices herein, such as computing system 104 may be configured to execute VMs associated with network applications/services as well as secure enclaves and associated API services that allow for a user to access sensitive information and data persisted in association with computing system 104, e.g., in an on-premise data storage such as resource system 112, according to embodiments.

As illustrated, computing system 104 includes a secure enclave 106 and an API service 108. In embodiments, secure enclave 106 may be configured to include a secure and/or encrypted memory associated with processing circuitry that provides secure processing of program code/instructions and data/information. Secure enclave 106 may be configured to generate keys, signed certificates, and secure quotes that are inviolable in an encrypted memory, and to utilize the generated keys, signed certificates, and secure quotes in requesting and receiving secure data/information. In embodiments, API service 108 may be configured to provide, place, or make API calls, e.g., via a Representational State Transfer (REST) API or other API type, to handle requests for access to sensitive information and data in conjunction with secure enclave 106. Additional description of embodiments regarding details and functions of API service 108 and of secure enclave 106 are provided herein below.

System 100A also includes a token provider 110 that is trusted by secure enclave 106 and/or resource system 112, and that is configured to provide attestation tokens, as an attestation service, to authorized systems or entities for verifying access to sensitive information and data. Token provider 110 may comprise one or more server computers or computing devices, which may include one or more distributed or "cloud-based" servers, including being ones of a server cluster, as similarly described above for computing system 104. Token provider 110, as noted above, may be an attestation service and may be configured to perform an analysis(es) based at least on a hash value of a public key for secure enclave 106, information that is included in a secure quote, and/or the like, from secure enclave 106. If an analysis(es) indicates that secure enclave 106 is to receive an attestation token, token provider 110 is configured to generate the attestation token for use by secure enclave 106 in making an API call via API service 108 for access to data/information or a service(s) of resource system 112. In embodiments, token provider 110 may be hosted by a different server or hardware from secure enclave 106, as exemplarily illustrated.

It should be noted that as described herein, external computing system 102, computing system 104, token provider 110, and/or resource system 112 may be applicable to any type of system for performance of operations for embodiments. One example of implementations noted above are network, or "cloud," implementations, applications, or services in a network architecture/platform. A cloud platform may include a networked set of computing resources, including servers, routers, etc., that are configurable, shareable, provide data security, and are accessible over a network such as the Internet. Cloud applications/services may run on these computing resources, often atop operating systems that run on the resources, for entities that access the applications/services, locally and/or over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run the VMs described herein (emulated computer systems, including operating systems) for tenants. A hypervisor may present a virtual operating platform for tenants, according to embodiments. Hypervisors herein may use a secure enclave in which generated encryption keys are tied to a secure processing system portion, or a trusted computing base (TCB), of the system, e.g., a secure enclave as described herein.

Figure 1B:
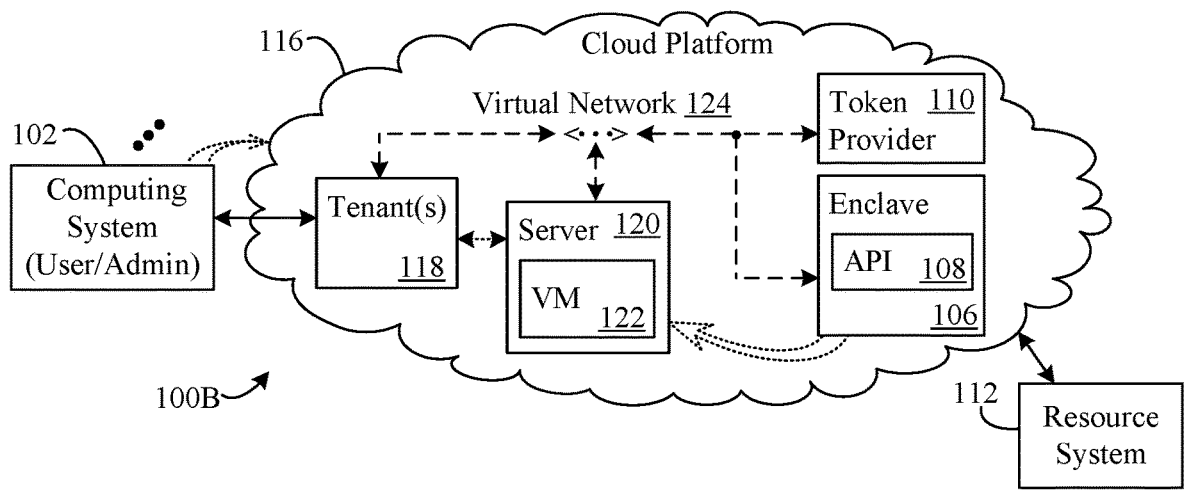
FIG. 1B shows a block diagram of a system for secure authentication using attestation tokens and inviolable quotes to validate request origins, according to an example embodiment.

For instance, referring now to FIG. 1B, a block diagram of a system 100B is shown, according to embodiments. System 100B is configured for secure authentication using attestation tokens and inviolable quotes to validate request origins, and is illustrated as an embodiment of system 100A of FIG. 1A. As shown in FIG. 1B, system 100B includes resource system 112 and a cloud platform 116 in place of computing system 104 described above for system 100A, which itself includes secure enclave 106 with API service 108, as well as token provider 110. It should also be noted here that various numbers of components for cloud platform 116 may be present in various embodiments. Additionally, any combination of the components illustrated in FIG. 1B may be present in system 100B, according to embodiments.

While not extensively shown or described for brevity and illustrative clarity, cloud platform 116 may comprise any number and/or type of internal communication links and/or computing/routing hardware that connect computing devices and hosts/servers, etc., such as, but not limited to, wired or wireless networks and portions thereof, point-to-point connections, routers, switches, and/or the like, which may be utilized for interconnectivity through a virtual network(s) 124 within cloud platform 116. External computing system 102 is also shown in FIG. 1B, may be an embodiment of its described implementation in FIG. 1A, as described above, and may represent one or more external computing systems and/or computing devices, such as a user belonging to a tenancy hosted by cloud platform 116. A user (including tenants, partners, administrators, etc.) of external computing system 102 may belong to a tenancy or user group through which access to secure data/information persisted in resource system 112 is obtained.

A tenant server 118 is an example of a component of cloud platform 116 that may be communicated with by external computing system 102. Tenant server 118 may be any type of computing device and be configured to host at least one tenancy, illustrated as being in communication with a host server 120. Host server 120 is illustrated as executing, or being configured to execute, a VM 122. VM 122 may be associated with a sub-platform, network application(s), and/or network service(s) (including microservices) of cloud platform 116 for which a user/tenant (including partners) may have a subscription or access. In some embodiments herein, tenant server 118 may host accounts for one or more users to access secure data/information, such as is persisted in resource system 112, described herein. Such access may include reading or writing of data/information in resource system 112, which may include sensitive information/data requiring an attestation token and self-signed digital certificate of a requestor.

In one example, tenants of tenant server 118 may access host server 120 to utilize a network application/service or sub-platform executing in conjunction with VM 122 to retrieve secure data/information from resource system 112. In such examples, enclave 106 and API service 108 are utilized as described herein. VM 122 may connect to other components of cloud platform 116 via virtual network(s) 124 (which may include communicating via a subnet, etc., not shown for illustrative clarity and brevity). Virtual network(s) 124 may communicate with other virtual networks of cloud platform 116 in which other servers may execute other VMs associated with other network applications and/or services (including microservices). In other words, it is contemplated herein that any number of resources such as virtual networks, and associated servers, VMs, data stores, etc., and any number of servers, VMs, etc., may be located in a given virtual network. In embodiments where secure enclave 106 is hosted on a separate server/computing device from host server 120, as illustrated, VM 122 communicates a request to secure enclave 106 for data resource system 112 over virtual network(s) 124 on behalf of the user. In other embodiments, secure enclave 106 may be a portion of host server 120. In each case, a request for secure data/information from resource system 112 is performed utilizing enclave 106 and token provider 110, as described herein.

Referring now to FIG. 2 and FIG. 3, computing system 104 of FIG. 1A and/or cloud platform 116 of FIG. 1B may be configured in various ways for secure authentication using attestation tokens and inviolable quotes to validate request origins. For instance, FIG. 2 shows a block diagram of a system 200, and FIG. 3 shows a flowchart 300, according to example embodiments for secure authentication using attestation tokens and inviolable quotes to validate request origins. System 200 may be an embodiment of system 100A of FIG. 1A and/or system 100B of FIG. 1B, e.g., a server of computing system 104 and/or cloud platform 116 (e.g., host server 120, secure enclave 106, and/or the like). System 200 and flowchart 300 are described as follows.

System 200 is illustrated by way of example as comprising a cloud- or network-portion 240, including a computing device 202 and a token provider 224, as well as an on-premise portion 238, including resource system host 230.

Resource system host 230 may be an embodiment of resource system 112 described for FIGS. 1A and 1B above. Resource system host 230 may be any type of server or host or storage device and includes a trust validator 232. In embodiments, resource system host 230 may include a service(s) 242, which may be a computational service, a privileged functional service, etc., and/or data/information ("data") 236, which may be confidential/sensitive data/information, e.g., credit card numbers. Trust validator 232 may be configured to determine, or validate, a requestor of data 236 as being known, expected, and/or trusted. Resource system host 230 may also locally store or cache signing certificates 234, which may be ones of signing certificates 228 stored by token provider 224 and used to sign attestation tokens, as described below. That is, not all of signing certificates 228 maintained by token provider 224 are provided to resource system host 230, according to embodiments.

Token provider 224, which may be an embodiment of token provider 110 described for FIGS. 1A and 1B above, and which may be an attestation service implemented as any type of server or computing device, as mentioned elsewhere herein, or as otherwise known, is configured to generate tokens such as attestation tokens, signed with a signing certificate of signing certificates 228, via a token generator 226, and may store one or more signing certificates 228 as described herein. Token generator 226 may be configured to generate tokens such as attestation tokens based at least on a hashed value of a public key provided in a secure quote and/or a self-signed digital certificate received from a secure enclave. Token generator 226 may be configured to generate attestations tokens based at least on a hash value of a secure enclave public key, described in further detail below, and may various types of token generation software, tools, etc., configured to generate attestation tokes as described herein for embodiments. An attestation token generated by token generator 226 and signed with a signing certificate thereof may be required for validating access requests to secure data in a secure data storage, to computational services, and/or the like, in embodiments. Signing certificates 228 may comprise signed digital certificates generated by token provider 224, which may rotate (i.e., be replaced or updated) periodically for improving security thereof.

Computing device 202, which may be an embodiment of a server of computing system 104 and/or cloud platform 116 described for FIGS. 1A and 1B above, and which may be implemented as any type of server or computing device, as mentioned elsewhere herein, or as otherwise known, is also illustrated as a portion of system 200, and in embodiments, may operate as a secure enclave. As shown in FIG. 2, computing device 202 may include one or more processors ("processor") 204, one or more of a memory and/or other physical storage device ("memory") 206, as well as one or more network interfaces ("network interface") 222. Computing device 202 includes an enclave engine 208 that may be an embodiment of enclave 106 described for FIGS. 1A and 1B, and an API service 220 that may be an embodiment of API service 108 described for FIGS. 1A and 1B. Computing device 202 may also include or be configured to execute one or more VMs and/or software applications (not shown for brevity and illustrative clarity), and similarly, a hypervisor as described herein, in embodiments. These components of system 200 may be configured for secure authentication using attestation tokens and inviolable quotes to validate request origins, as described herein.

Computing device 202 of system 200 may also include additional components (not shown for brevity and illustrative clarity) including, but not limited to, components and subcomponents of other devices and/or systems herein, as well as those described below with respect to FIG. 9, such as an operating system, etc.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (including cache memories), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of enclave engine 208 and/or API service 220, including one or more of the components thereof as described herein, some or all of which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein (i.e., memory portions acting as program memory), as well as to store other information and data described in this disclosure including, without limitation, embodiments of enclave engine 208, API service 220, and/or the like. In embodiments, memory 206 may comprise secure or restricted portions of memory such as encrypted memory 218, which may comprise a portion of a secure enclave as described herein, and in which some operations related to the described embodiments are executed by processor 204. In embodiments, encrypted memory 218 may persistently store a private key of a key pair for a secure enclave in such a manner that the private key is never exposed outside of encrypted memory 218. Additionally, encrypted memory 218 is configured to prevent access to and exposure of operations performed therewith, such as operations that utilize the private key, e.g., secure quote generation, decrypting operations, encrypting operations, and/or the like.

Network interface 222 may be any type or number of wired and/or wireless network adapter, modem, etc., configured to enable system 200, including computing device 202, to communicate with other devices and/or systems over a network and/or a cluster communication infrastructure, as described herein. In embodiments, network interface 222 may be implemented externally to computing device 202.

Enclave engine 208 includes a certificate generator 210, a quote generator 212, a cryptographic engine 214, and a token manager 216, in the illustrated embodiment. Certificate generator 210 is configured to generate self-signed digital certificates described herein that serve as credentials of trust for computing device 202 in its capacity as a secure enclave. In embodiments, a self-signed digital certificate generated by certificate generator 210 includes a secure quote and a public key of the key pair that includes the private key stored in encrypted memory 218. Quote generator 212 is configured to generate secure quotes described herein in encrypted memory 218. Secure quotes generated by quote generator 212 may include an identifier that identifies the secure enclave in which it is generated as well as a hash value of the public key of the secure enclave. In embodiments, cryptographic engine 214 may be configured to generate the hash of the public key in encrypted memory 218, and may also be configured to perform decrypting and re-encrypting operations on received data 236, as described in further detail herein. Token manager 216 may be configured to request tokens, such as attestation tokens, from token provider 224, in embodiments, and store received tokens in memory 206 for use in making API calls to resource system host 230 for confidential/sensitive data 236. In embodiments, token manager 216 may make token requests via API service 220, and in some embodiments, while shown as a portion of enclave engine 208 in system 200, token manager 216 may comprise a portion of API service 220.

API service 220 is configured to place or make API calls from computing device 202 to resource system host 230 to obtain data 236 and/or to access service(s) 242. In embodiments, API service 220 places or makes API calls that include a self-signed digital certificate generated by certificate generator 210 as well as the attestation token requested by token manager 216 and received from token provider 224. API calls from API service 220 establish a secure communication sessions between data resource system 230 and computing device 202 (which acts as and embodies a secure enclave) based at least on the self-signed digital certificate included in the API call. Additionally, API service 220 may place or make such calls as REST API calls and may run in a secure container on computing device 202.

Additional details regarding system 200 and its components are provided herein with respect to other Figures described below.

Referring also now to FIG. 3, flowchart 300 begins at step 302. In step 302, an API is made call from a secure processing system to a resource system, the API call including a self-signed certificate of the secure processing system and an attestation token that is provided based at least on a secure quote of the secure processing system. Referring back to FIG. 2 and system 200, as described above, API service 220 is configured to place or make API calls to resource system host 230 for accesses to data 236 and/or service(s) 242. API service 220 may place or make such calls based on requests from users, e.g., of external computing system 102 in FIGS. 1A and 1B, for confidential/sensitive data/information in data 236. API service 220 generates API calls to resource system host 230 that include self-signed digital certificates generated by a secure enclave, e.g., by certificate generator 210 of enclave engine 208, and attestation tokens received from token provider 224, which generates attestation tokens based on secure quotes generated by quote generator 212 of enclave engine 208 via encrypted memory 218 in computing device 202, which acts as a secure enclave, as described herein.

Further details regarding step 302 of flowchart 300 are provided in the description below. For example, details regarding the generation of attestation tokens by token provider 224 based at least on a secure quote and a self-signed digital certificate from computing device 202 acting as a secure enclave are provided herein.

Referring now again to FIG. 3 and flowchart 300, in step 304, confidential information is provided from the resource system to the secure processing system responsive to the API call subsequent to a determination, based at least on the self-signed certificate and the attestation token, that the secure processing system is a trusted requestor. For instance, in reference to FIG. 2 and system 200, resource system host 230 is configured to determine that the request for data 236 via the API call from API service 220 is from an expected, trusted requestor, in this example, computing device 202 acting as a secure enclave (i.e., a secure processing system). This determination is based at least on the self-signed certificate and the attestation token provided with the API call by trust validator 232 of resource system host 230. Once the determination is made that the caller is known and trusted, resource system host 230 provides back the requested data from data 236 or service(s) 242 to computing device 202 in response to the API call. Further details regarding step 304 of flowchart 300 are provided in the description below.

Additionally, data/service requestor trust validations performed by a data storage/computational service such as resource system host 230, as well as functions and/or operations to further maintain security for the returned portion of the data performed by processing device 202 utilizing encrypted memory 218, are further described below. For example, details regarding the receipt and handling, by processing device 202 acting as a secure enclave, of confidential/sensitive data in an encrypted format, which is returned for an API call, without exposing the data in an unencrypted form are provided herein.

Moreover, while shown separately for illustrative clarity, it should be noted that embodiments contemplate one or more of the components/sub-components of computing system 200 of FIG. 2 being combined together and/or as a part of other components of system 200. In some embodiments, less than all of the components of computing device 202 as illustrated may be included. In software implementations, one or more components of computing device 202 may be stored in memory 206, including encrypted memory 218 in embodiments, and may be executed by processor 204 to perform their described functions and operations. Further details regarding system 200 and computing device 202, and their components and/or subcomponents, are described in embodiments below.

As noted above for FIG. 1A, FIG. 1B, FIG. 2, and FIG. 3, embodiments herein provide for secure authentication using attestation tokens and inviolable quotes to validate request origins. System 100A of FIG. 1A, system 100B of FIG. 1B, and system 200 of FIG. 2, may each be configured to perform such functions and operations, according to embodiments. FIG. 4, FIG. 5, FIG. 6, FIG. 7, and FIG. 8 are now described below with reference to these systems.

Figure 4:
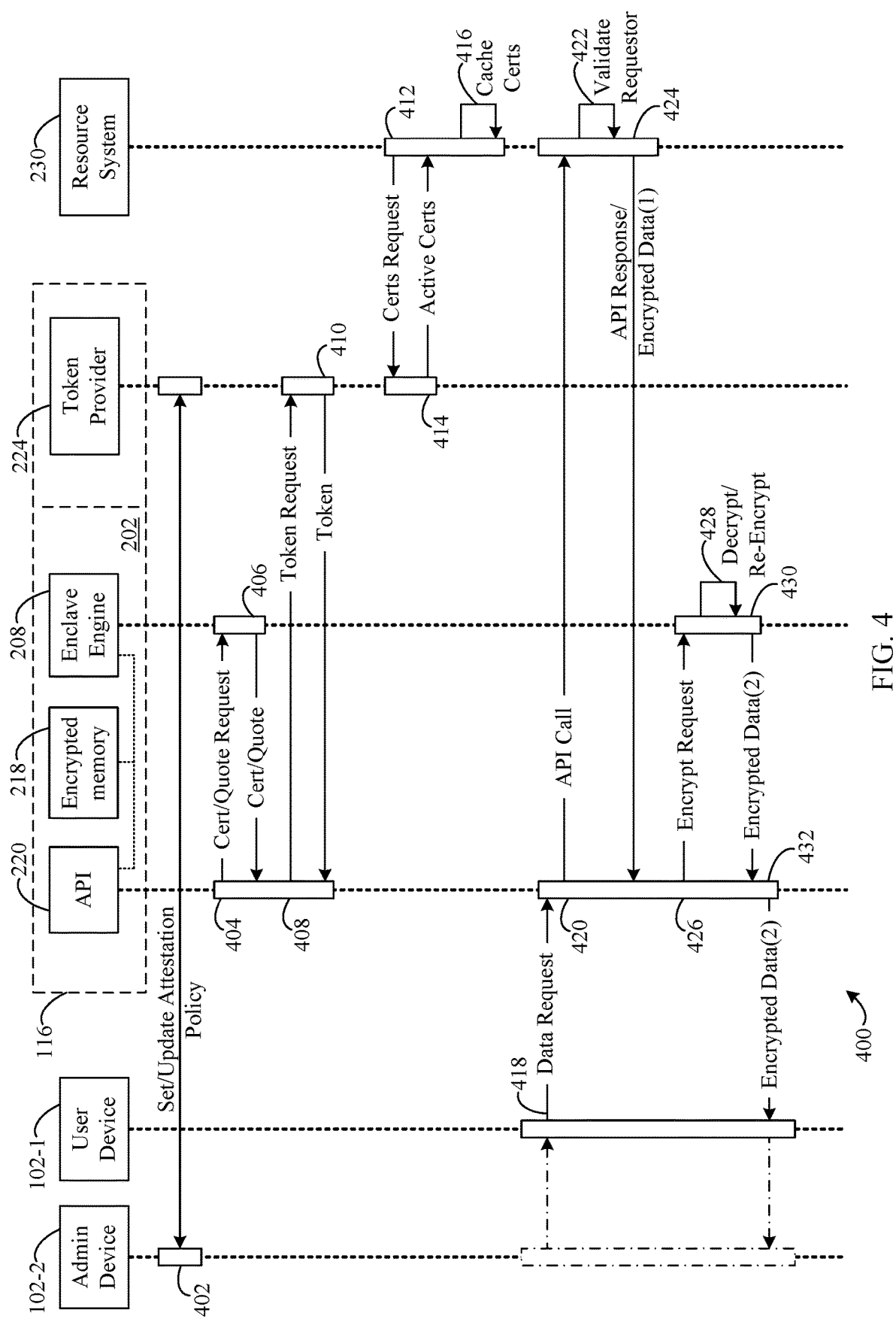
FIG. 4 shows a flow diagram for secure authentication using attestation tokens and inviolable quotes to validate request origins, in accordance with an example embodiment.
Figure 5:
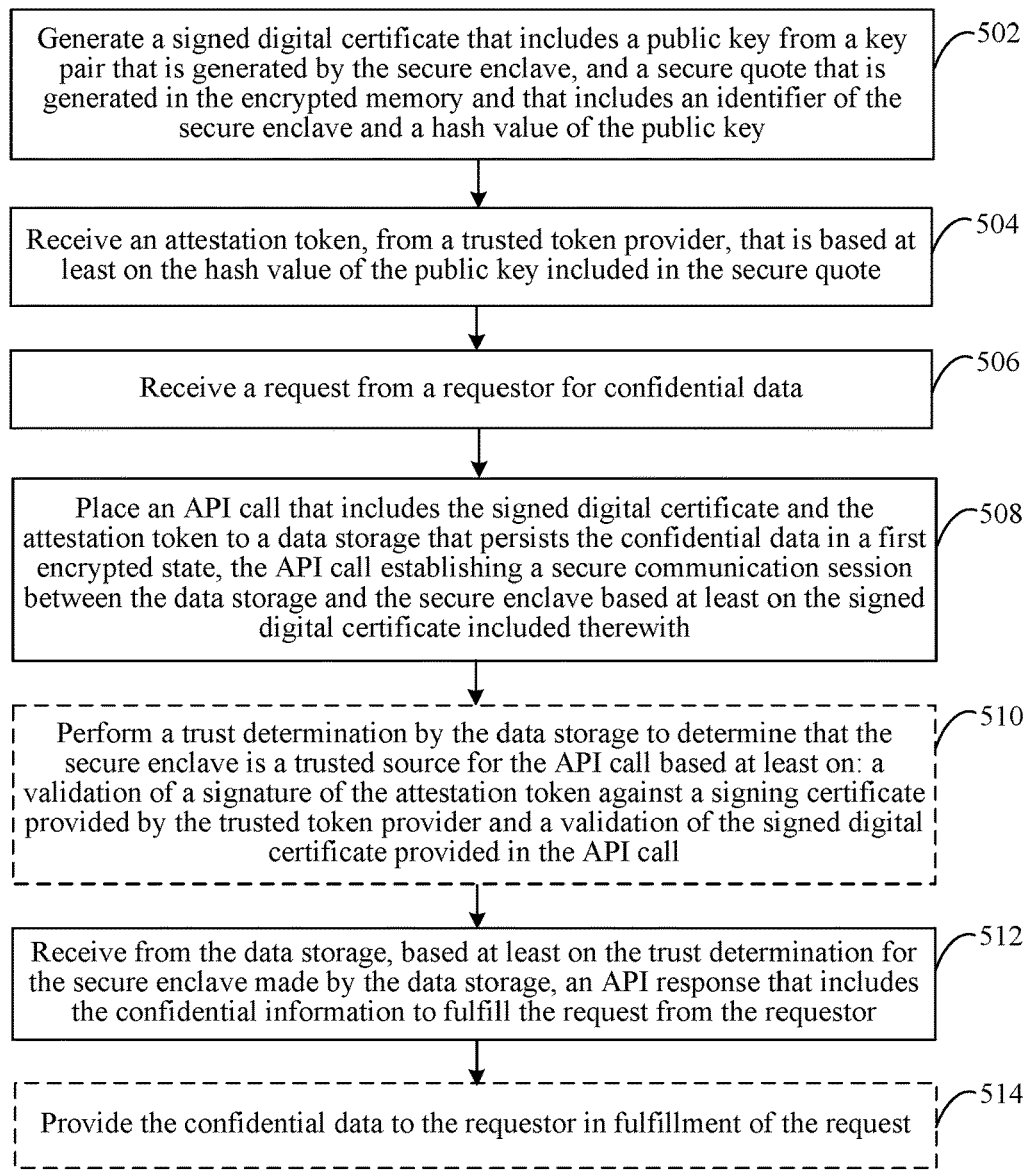
FIG. 5 shows a flowchart for secure authentication using attestation tokens and inviolable quotes to validate request origins, in accordance with an example embodiment.
Figure 6:
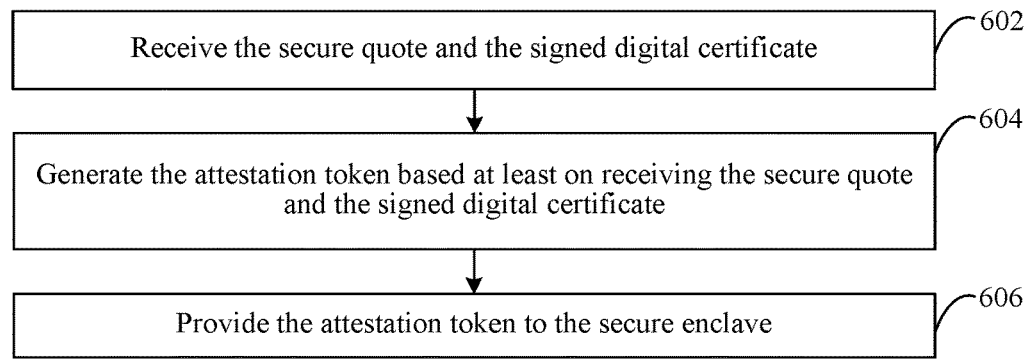
FIG. 6 shows a flowchart for secure authentication using attestation tokens and inviolable quotes to validate request origins, in accordance with an example embodiment.
Figure 7:
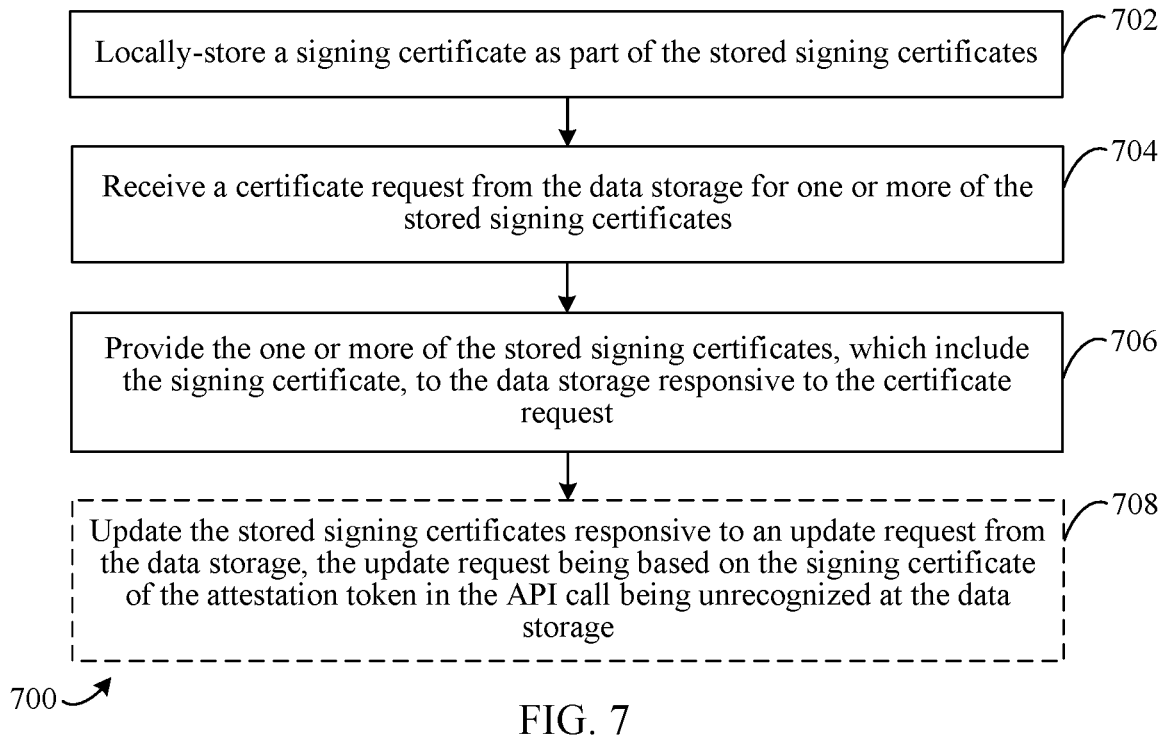
FIG. 7 shows a flowchart for secure authentication using attestation tokens and inviolable quotes to validate request origins, in accordance with an embodiment.
Figure 8:
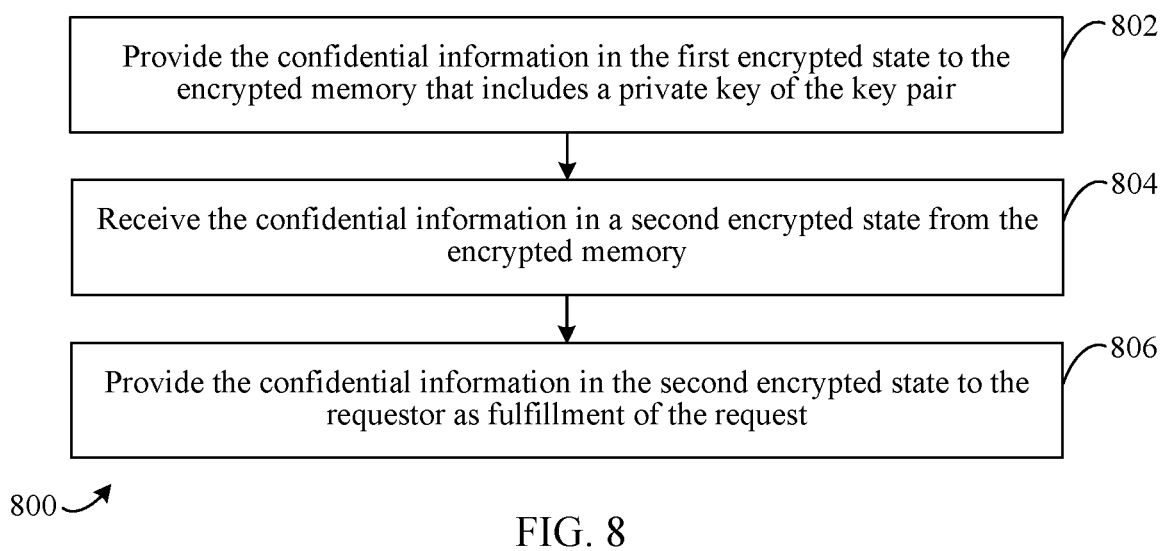
FIG. 8 shows a flowchart for secure authentication using attestation tokens and inviolable quotes to validate request origins, in accordance with an embodiment.

FIG. 4 shows a flow diagram 400 for secure authentication using attestation tokens and inviolable quotes to validate request origins and represents an embodiment of system 100B of FIG. 1B and system 200 of FIG. 2. FIG. 5 shows a shows a flowchart 500, FIG. 6 shows a flowchart 600, FIG. 7 shows a shows a flowchart 700, and FIG. 8 shows a flowchart 800, each being for secure authentication using attestation tokens and inviolable quotes to validate request origins, and each of which may be an embodiment of flowchart 300 of FIG. 3 and/or flow diagram 400 of FIG. 4. Further structural and operational examples of embodiments will be apparent to persons skilled in the relevant art(s) based on the following descriptions.

As noted above, flow diagram 400 represents an embodiment of system 100B of FIG. 1B and system 200 of FIG. 2, and illustrates components thereof. For example, cloud platform 116 of FIG. 1B is illustrated as including computing device 202, with API service 220, encrypted memory 218, and enclave engine 208, as well as token provider 224. Resource system host 230 may be an on-premise data storage embodiment for flow diagram 400, although it is also contemplated that embodiments for a computational service(s) are applicable for resource system host 230 in flow diagram 400 (e.g., based on the description details herein). Additionally, two instances of external computing system 102 of FIG. 1B are illustrated in flow diagram 400 as a user device 102-1 and as an administer device 102-2 which may be external to cloud platform 116.

Flow diagram 400 begins at step 402. In step 402, an attestation policy is set up with token provider 224. For example, an administrator via administrator device 102-2 may set up an attestation policy for token provider 224 through access thereto. The attestation policy that is set up may include requestor information for version numbers, certificate generation tools/applications, etc., and to identify computing device 202 as a secure enclave and a TCB (i.e., a secure processing system) that is expected to request confidential/sensitive data/information from data 236 of resource system host 230. In embodiments, the attestation policy may be customized and/or may provide for attestation tokens to only be issued if a provided secure quote is valid and satisfies the custom policy. The administrator at administrator device 102-2 may receive a confirmation back in step 402 from token provider 224 that the attestation policy is deployed.

In step 404 of flow diagram 400, API service 220 requests a self-signed digital certificate (also "self-signed certificate" and/or "signed digital certificate" herein) and a secure quote from enclave engine 208, i.e., API service 220 requests that the self-signed digital certificate and the secure quote are generated using encrypted memory 218 of processing device 202 acting as a secure enclave.

Referring also now to FIG. 5, flowchart 500 begins with step 502. In step 502, a signed digital certificate is generated that includes a public key from a key pair that is generated by the secure enclave, and a secure quote that is generated in the encrypted memory and that includes an identifier of the secure enclave and a hash value of the public key. For instance, certificate generator 210 and quote generator 212 of enclave engine 208 are configured to respectively generate a signed digital certificate and a secure quote as called for in step 502. Such generation may be performed responsive to a request therefor from API service 220.

Certificate generator 210 may be configured to generate a signed digital certificate for computing device 202, which acts as a secure enclave, to include a public key of a key pair for which the private key is held in encrypted memory 218. Certificate generator 210 may comprise any type of signed certificate generating tool/application, and as such, may be identified in generated signed digital certificates by one or more unique identifiers, version numbers, and/or the like.

Quote generator 212 may generate secure quotes utilizing encrypted memory 218. These secure quotes may be used by a token provider to verify that computing device 202, as a secure enclave, is a TCB as secure quotes are inviolable. That is, quote generator 212 generates secure quotes according to embodiments by using the private key in encrypted memory 218 that is both unique to computing device 202 and wholly inaccessible outside of encrypted memory 218 to sign the secure quotes. This provides a unique signature for identifying computing device 202 through secure quotes that cannot be duplicated. Moreover, quote generator 212 generates secure quotes in encrypted memory 218 to include a hashed value of the public key, and in embodiments, this hashed value may be determined by cryptographic engine 214 in conjunction with quote generator 212. The hashed value of the public key for computing device 202 thus provides an additional check for the security and trust required to issue an attestation token by token provider 224, as described herein. In other words, because the secure quote is generated to include such data/information via encrypted memory 218, which is inaccessible as far as data/process exposure, the generated secure quotes are a reliable measure for determining that API calls coming from API service 220 in computing device 202, acting as a secure enclave, are from this trusted source.

Referring back to FIG. 4 and flow diagram 400, in step 406 the (self-) signed digital certificate and the secure quote are generated by enclave engine 208, as described above, based on the request from API service 220, and are provided to API service 220 in fulfilment of the request. In step 408, a token request is provided from API service 220, e.g., based on a command from token manager 216 shown in FIG. 2, to token provider 224. Embodiments herein may provide for trust policies related to confidential/sensitive data/information access to require attestation tokens from a trusted token provider for validation. Accordingly, the token request in step 408 is provided, and may include the secure quote and the signed digital certificate generated by enclave engine 208, as described above. In embodiments, token provider 224 may fulfill the token request sent from API service 220 by generating, e.g., via token generator 226 and based at least on the (self-)signed digital certificate and the secure quote, and providing an attestation token to API service 220 in step 410 of flow diagram 400, where the provided attestation token received by API service 220 may be stored by token manager 216 in memory 206 (shown in FIG. 2) for inclusion in API calls, as described herein. Additionally, with respect to step 408, when the signed digital certificate generated by enclave engine 208 is received with the token request by token provider 224, the signed digital certificate may be stored locally at token provider 224.

Further to the generation and provision of the attestation token, and referring again to flowchart 500 and FIG. 5 and also to flowchart 600 of FIG. 6, in step 504, an attestation token is received, from a trusted token provider, that is based at least on the hash value of the public key included in the secure quote. As an example according to embodiments, an attestation token that is generated for computing device 202, by token provider 224 and responsive to a request therefor (as in step 408 of flow diagram 400) may be received by API service 220 in step 504, as similarly described above.

With reference now to FIG. 6, flowchart 600 may be performed by token provider 224 subsequent to receiving the token request of step 408 in flow diagram 400 and prior to providing the attestation token in step 410. Similarly, flowchart 600 may be performed prior to step 504 of flowchart 500 in FIG. 5, with step 504 occurring based on flowchart 600 completing. Flowchart 600 begins at step 602.

In step 602, the secure quote and the signed digital certificate are received. For example, token provider 224 may receive the secure quote and the signed digital certificate from API service 220 in the token request from step 408. Token provider 224 may validate that API service 220, which makes the token request, is in fact, a TCB that is authorized to request attestation tokens. Accordingly, token provider 224 is configured to make this determination to validate based at least on an analysis/processing of the secure quote, the signed digital certificate, and/or other information provided in the token request from API service 220. In embodiments, with the secure quote being generated by computing device 202 in encrypted memory 218, the analysis/processing of various information from the token request provides a reliable and robust way to verify that the token request is from an authorized entity.

In step 604 of flowchart 600, the attestation token is generated based at least on receiving the secure quote and the signed digital certificate. For example, if the analysis/processing of information/data in the token request, as in step 602, indicates that the API call is from an authorized entity, e.g., a secure enclave of computing device 202, then token provider 224 knows that the token request from API service 220 is a legitimate request from a trusted source, and token provider 224 may then generate the attestation token, utilizing token generator 226, that is requested by API service 220, and the generation is based at least on the receiving in step 602. In embodiments, token generator 226 includes an identifier of token provider 224, e.g., a uniform resource identifier (URI), in the attestation token, and signs the attestation token with a signing certificate of signing certificates 228 (which may be shared with resource system host 230, as described in further detail herein).

In step 606, the attestation token is provided to the secure enclave. For example, token provider 224 is configured to provide the attestation token generated in step 604 to API service 200 to fulfill the token request, as shown for step 410 in flow diagram 400 for FIG. 4. As described above, the attestation token that is provided to the secure enclave in step 606 is received in step 504 of flowchart 500 in FIG. 5.

Turning back to flow diagram 400 of FIG. 4, in step 412, resource system host 230 is configured to request signing certificates from token provider 224. For example, signing certificates 228 maintained by token provider 224 may include one or more signing certificates that are active or currently used by token generator 226 to sign generated attestation tokens. Resource system host 230 requests these signing certificates. That is, in step 412, the request from on-premise data storage in embodiments, such as resource system host 230, seeks to obtain any active signing certificates 228 which are stored locally at token provider 224, and in step 414 of flow diagram 400, token provider 224 provides the requested signing certificates to resource system host 230 for later validation of API calls to access data persisted at resource system host 230.

In reference also now to FIG. 7 and flowchart 700, this flowchart begins at step 702 and may be performed by token provider 224 and/or resource system host 230. In step 702, the signing certificate is locally-stored as part of the stored signing certificates. For example, token provider 224 locally-stores a signing certificate used by token generator 226 to sign generated attestation tokens, as described herein. As shown in FIG. 2 and described herein, token provider 224 includes signing certificates 228 that may comprise cached, or otherwise stored, signing certificates.

In step 704, a certificate request is received from the data storage for one or more of the stored signing certificates. For example, as noted above, resource system host 230 is configured to request signing certificates (i.e., the signing certificates used to sign generated attestation tokens) that are stored locally by token provider 224, as also shown in step 412 of flow diagram 400. Accordingly, token provider 224 receives the certificate request from resource system host 230. Resource system host 230 may provide certificate requests periodically, in response to change notifications from token provider 224, based on administrator commands, and/or the like.

In step 706, the one or more of the stored digital certificates, which include the signing certificate, are provided to the data storage responsive to the certificate request. For example, token provider 224 provides the requested signing certificates to on-premise resource system host 230, as noted for step 414 of flow diagram 400. In embodiments, token provider 224 provides active signing certificates, i.e., current or "in use" signing certificates, to resource system host 230 and does not provide any expired signing certificates in response to the certificate request. Resource system host 230 is configured to cache or otherwise store the received signing certificates as signing certificates 234 (shown in FIG. 2), which are utilized to validate API calls requesting access to data 236, described in further detail elsewhere herein. Referring back again to of FIG. 4, as noted above, when the active signing certificates are provided to resource system host 230 in step 414 from token provider 224, these signing certificates may be cached locally by resource system host 230 in step 416 of flow diagram 400.

In some embodiments, actively performing step 708 of flowchart 700 may be optional. In step 708, the stored signing certificates are updated responsive to an update request from the data storage, the update request being based on the signing certificate of the attestation token in the API call being unrecognized at the data storage. For example, one or more of the steps above for flowchart 700 (and similarly illustrated as repeating one or more of step 412, step 414, and/or step 416 of flow diagram 400) may be repeated for updating signing certificates 234 (shown in FIG. 2) when an API call requesting access to data 236 is received with an attestation token having an unrecognized signature (e.g., based on an out of date signing certificate). In this way, current or newly-active signing certificates may be obtained by resource system host 230 to validate that API calls are from expected, trusted originators. Additional details regarding API calls for access to confidential/sensitive data/information are provided below with reference to the remaining portions of FIG. 4 and FIG. 5.

Continuing now with FIG. 4 and FIG. 5, the operations and functions for handling requests to access confidential/ sensitive data/information are described. Referring to flow diagram 400 in FIG. 4, at step 418, a data request for confidential/sensitive data/information is received by computing device 202, e.g., at API service 220, from user device 102-1. In some embodiments, such a data request may be provided from administrator device 102-2. The data request received in step 418 may specify confidential/sensitive data of data 236 that is persisted in resource system host 230, shown in FIG. 2.

For instance, in step 506 of flowchart 500, a request from a requestor is received for confidential data. As similarly noted above, a data request for confidential/sensitive data/information is received from user device 102-1 by computing device 202. In embodiments, the data request may be directed to API service 220 which is configured to place or make API calls to resource system host 230 for confidential/sensitive data of data 236, shown in FIG. 2. In embodiments, a user of device 102-1, and/or user device 102-1 itself, may be required to provide specific credentials with or prior to providing the data request, e.g., the user may be required to be a member of a specific/private group that is allowed to make such data requests.

At step 420 of flow diagram 400, an API call is placed from API service 220 to resource system host 230 for access to data specified in the data request described above. As described herein, resource system host 230 may require specific credentials in API calls in order to validate requests as being from expected, trusted originators for confidential/sensitive data (e.g., data 236 as in FIG. 2) persisted thereby in order to prevent stolen credentials from being utilized by bad actors for unauthorized exfiltration of the confidential/sensitive data.

For instance, in step 508, an API call is placed that includes the signed digital certificate and the attestation token to a data storage that persists the confidential data in a first encrypted state, the API call establishing a secure communication session between the data storage and the secure enclave based at least on the signed digital certificate included therewith. The API call placed from API service 220 to resource system host 230 is generated by API service 220 to include the signed digital certificate and the attestation token described for step 406/step 410 of flowchart 400 and step 502/step 504 of flowchart 500. The signed digital certificate and the attestation token included in the API call enable resource system host 230 to validate that the API call are from expected, trusted originator.

In embodiments, API calls placed from API service 220 to resource system host 230 establish a secure communication session, such as a mutual TLS session that may be established via hyper-text transfer protocol (HTTP). In embodiments, API service 220 is configured to utilize the (self-)signed digital certificate generated by enclave engine 208 (e.g., via certificate generator 210) and included in the API call to establish the mutual TLS session with resource system host 230. Trust validator 232 (shown in FIG. 2) of resource system host 230 may be configured to analyze the signed digital certificate of the API call, and determine that a trusted caller has provided the API call, to permit the establishment of the secure communications session.

At step 422 of flow diagram 400, resource system host 230 validates the data requestor (i.e., the origin of the API call request for data). That is, embodiments herein provide for resource system host 230 to validate that computing device 202 is an expected and trusted origin of the API call that is acting as a secure enclave.

Regarding FIG. 5, in some embodiments, actively performing step 510 of flowchart 500 may be optional. In step 510, a trust determination is performed by the data storage to determine that the secure enclave is a trusted source for the API call based at least on: a validation of the attestation token against a signing certificate provided by the trusted token provider and a validation of the signed digital certificate provided in the API call. For example, resource system host 230 is configured to perform a trust determination to validate computing device 202 is a trusted source for the API call. In embodiments, trust validator 232 (shown in FIG. 2) of resource system host 230 performs the trust determination—that is, trust validator 232 may be configured to determine, or validate, a requestor of data 236 (shown in FIG. 2) as being known, expected, and/or trusted.

While resource system host 230 may permit establishing secure communication sessions based on self-signed digital certificates, trust validator 232 is configured to analyze the attestation token received in the API call from API service 220 of computing device 202 and to determine that the attestation token is a valid token from token provider 224, and that properly identifies computing device 202 acting as a secure enclave in order to grant access to data persisted at resource system host 230. Trust validator 232 validates the attestation token signature, which is generated by token provider 224 with the attestation token, against a corresponding signing certificate of signing certificates 234 (shown in FIG. 2 and described above) and determines if the URI of the attestation token matches that known to be associated with token provider 224, which proves that the attestation token is a valid token issued by token provider 224 and associated with computing device 202, which has a valid signed digital certificate and issues the API call that includes the attestation token.

In embodiments, for cases where the signing certificate is not recognized by trust validator 232, an update may be triggered against token provider 224, as described above for step 708 of flowchart 700 in FIG. 7, prior to disabling the secure communication session and cancelling or refusing the API call request for data, which may avoid service interruptions at times when signing certificates are rotated.

In flow diagram 400 of FIG. 4, after validation is performed in step 422, step 424 includes providing from resource system host 230 an API response to the API call back to API service 220 of computing device 202. The API response is generated to include the data (e.g., from data 236) persisted by resource system host 230 that was requested by the API call. In embodiments, data 236 may be persisted in an encrypted state as "encrypted data(1)," where "(1)" denotes the first encrypted state.

In FIG. 5, flowchart 500 continues with step 512 in which an API response that includes the confidential information to fulfill the request from the requestor is received from the data storage via the secure communication session, based at least on a trust determination for the secure enclave made by the data storage. For example, if trust validator 232 validates the API call and its origin of computing device 202, as a secure enclave, and as described above, API service 220 receives the API response with the data/information, which may be in a first encrypted state, from resource system host 230. API service 220 may store the received data/information from the API response in memory 206 of FIG. 2, e.g., in encrypted memory 218 which configured to prevent access to both decrypting operations and encrypting operations that utilize the private key of computing device 202, acting as a secure enclave, stored in encrypted memory 218, as described above.

As the received data/information from the API response may be in a first encrypted state associated with resource system host 230, computing device 202 is configured to change the encryption of the data/information to a second encrypted state prior to providing the data/information to the requesting user/entity. In FIG. 4, flow diagram 400 continues with step 426 in which an encrypt request for the data/information is provided to enclave engine 208, e.g., to cryptographic engine 214.

Referring also now to FIG. 8, flowchart 800 may be performed by computing device 202 subsequent to receiving the API response described for step 512 of flowchart 500 above. Flow chart 800 begins at step 802 in which the confidential information in the first encrypted state is provided to the encrypted memory that includes a private key of the key pair. For example, as described for step 512 of flowchart 500 above, the data/information returned from resource system host 230 to API service 220 is provided to encrypted memory 218, and an encrypt request as in step 426 of flow diagram 400 is provided to cryptographic engine 214 for performing operations/functions via encrypted memory 218, which utilized in embodiments because it provides an inaccessible memory space in which the private key can be used to perform sensitive operations/functions for confidential/sensitive data and information.

As illustrated in step 428 of flow diagram 400, the data/information is decrypted from the first encrypted state via cryptograph engine 214 using encrypted memory 218, and is then re-encrypted via cryptograph engine 214 using encrypted memory 218 to the second encrypted state (denoted as "encrypted data(2)" in flow diagram 400). In embodiments, the private key maintained encrypted memory 218 may be used for decrypted/re-encrypting the data/information.

In step 430 of flow diagram 400, the re-encrypted data (denoted as "encrypted data(2)") is provided back to API service 220 from enclave engine 208 and encrypted memory 218. With respect to FIG. 8 and flowchart 800, this is illustrated by step 804 in which the confidential information is received in a second encrypted state from the encrypted memory.

Referring back to FIGS. 4 and 5, the re-encrypted data (denoted as "encrypted data(2)") is provided from API service 220 to user device 102-1 in step 432 of flow diagram 400. With respect to flowchart 500, in some embodiments, actively performing step 514 may be optional. In step 514, the confidential data is provided to the requestor in fulfillment of the request. That is, API service 220 fulfills the initial data request from the user by returning the data/information in the API response described above to user device 102-1. In embodiments where administrator device 102-2 provides the initial data request, step 432 of flow diagram 400 and/or step 514 of flowchart 500 include transmitting the data/information to administrator device 102-2.

With reference to FIG. 8 and flowchart 800, it is noted herein that data/information obtained via API call from API service 220 from resource system host 230 may be in a first encrypted state that is changed to a second encrypted state by computing device 202. In step 806, which may be an embodiment of step 432 and/or step 514 described above, the confidential information is provided in the second encrypted state to the requestor as fulfillment of the request.

Finally, referring back to FIG. 4 and as noted herein, while data storage access embodiments are described for illustration, the embodiments encompassed herein are not so limited and also include embodiments for access to computational services. For instance, step 420 and step 424 of flow diagram 400, in a computational service embodiment, may include providing encrypted data in the API call of step 420 for which decryption is sought, while commensurately, step 424 may include providing back the data in a decrypted state for an API call response based at least on a computational service of resource system host 230 performing a decryption computation.

That is, embodiments also include a system comprising a secure enclave that includes an encrypted memory, a program memory storing program code, and a processing system comprising one or more processors configured to receive the program code from the program memory and, in response to at least receiving the program code, to: generate a signed digital certificate that includes: a public key from a key pair that is generated by the secure enclave, and a secure quote that is generated in the encrypted memory and that includes an identifier of the secure enclave and a hash value of the public key; receive an attestation token, from a trusted token provider, that is based at least on the hash value of the public key included in the secure quote; receive a request from a requestor for decryption of encrypted data; place an application programming interface (API) call that includes the signed digital certificate and the attestation token to a resource system or a computational service that performs processing or computation on the encrypted data, the API call establishing a secure communication session between the resource system, or the computational service, and the secure enclave based at least on the signed digital certificate included therewith; and receive from the resource system or the computational service via the secure communication session, based at least on a trust determination for the secure enclave made by the resource system or the computational service, an API response that includes the information in a decrypted state to fulfill the request from the requestor.

Likewise, embodiments also include a method performed utilizing a secure enclave of a processing system, the method comprising: generating a signed digital certificate that includes: a public key from a key pair that is generated by the secure enclave, and a secure quote that is generated in the encrypted memory and that includes an identifier of the secure enclave and a hash value of the public key; receiving an attestation token, from a trusted token provider, that is based at least on the hash value of the public key included in the secure quote; receiving a request from a requestor for decryption of encrypted data; placing an application programming interface (API) call that includes the signed digital certificate and the attestation token to a resource system or a computational service that performs processing or computation on the encrypted data, the API call establishing a secure communication session between the resource system, or the computational service, and the secure enclave based at least on the signed digital certificate included therewith; and receiving from the resource system or the computational service via the secure communication session, based at least on a trust determination for the secure enclave made by the resource system or the computational service, an API response that includes the information in a decrypted state to fulfill the request from the requestor.

Embodiments also include at least one computer readable storage medium having program code recorded thereon that, when executed by at least one processing system, perform the preceding method utilizing a secure enclave.

These embodiments for computational services are also applicable to aspects of the data storage embodiments noted herein, as would be understood by persons of skill in the relevant art(s) having the benefit of this disclosure.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100A and 100B of FIGS. 1A and 1B, respectively, and system 200 of FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
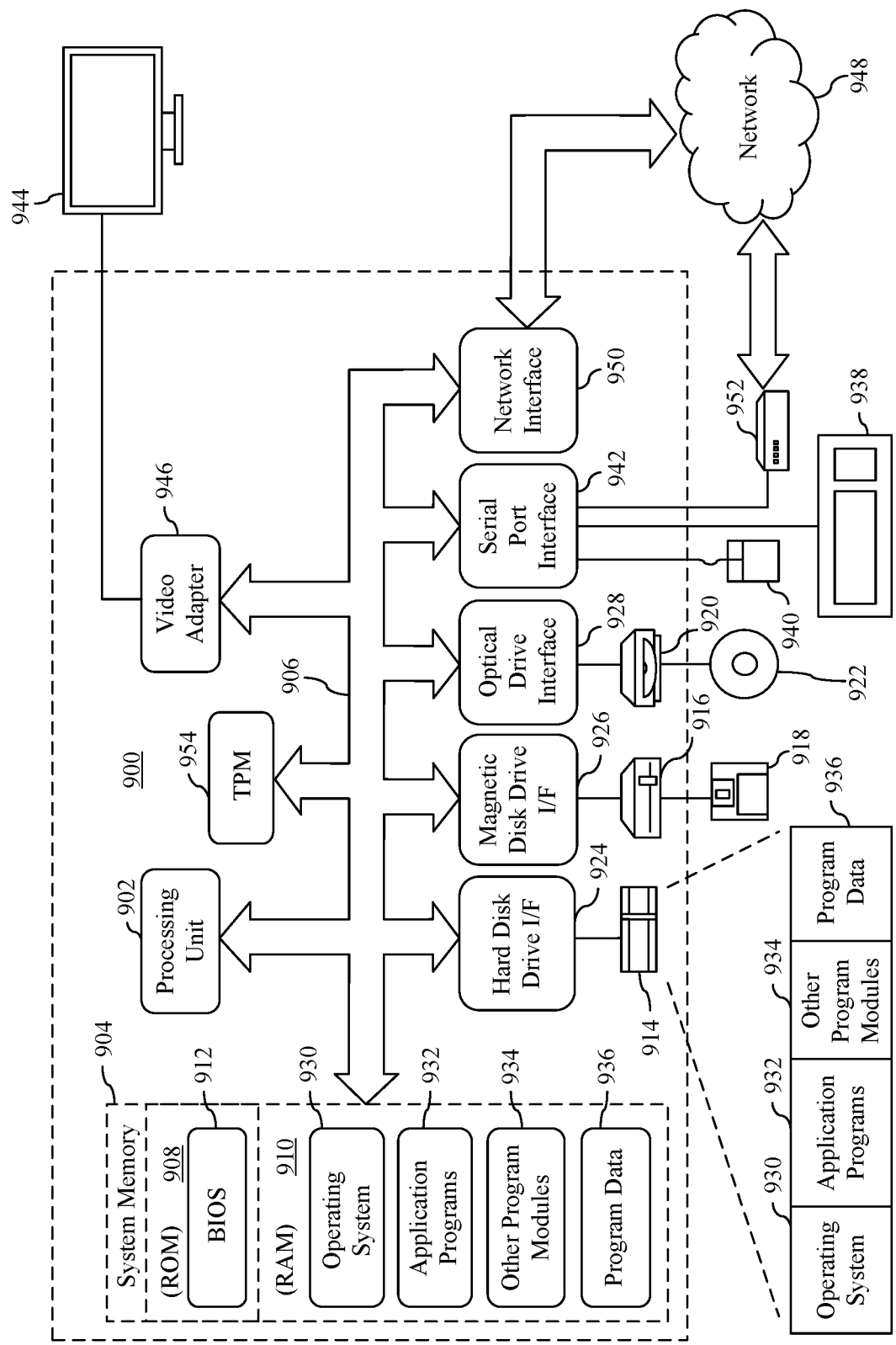
FIG. 9 shows a block diagram of an example computing device that may be used to implement embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, such as but not limited to, systems 100A and 100B of FIGS. 1A and 1B, respectively, and system 200 of FIG. 2, along with any components and/or subcomponents thereof, as well as the flowcharts/flow diagrams described herein, including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

TPM 954 may be connected to bus 906, and may be an embodiment of any TPM, as would be understood by one of skill in the relevant art(s) having the benefit of this disclosure. For example, TPM 954 may be configured to perform one or more functions or operations of TPMs for various embodiments herein.

As used herein, the terms "computer program medium," "computer-readable medium," "computer-readable storage medium," "computer-readable storage media," "computer-readable storage device," and/or the like, are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media, computer-readable storage media, etc., are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for secure authentication using attestation tokens and inviolable quotes to validate request origins. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

Regarding sensitive/confidential data and information, embodiments provide for secure authentication using attestation tokens and inviolable quotes to validate request origins though a unique and novel combination of hardware components and processes that allow for a data storage/computational service to unequivocally validate a requesting entity via numerous different authentication functions and operations at various points in the processes. Accordingly, validating request origins though secure authentication using attestation tokens and inviolable quotes, e.g., for requests to data stores having sensitive/confidential data and information and to computational services for decrypting encrypted data, as described herein, enables more robust security of sensitive/confidential data and information, even in cases of digital certificate theft and administrator-level access to hardware. For instance, secure enclaves with encrypted memories are utilized for embodiments in ways that prevent exposure of contents in any scenarios, and this enables the generation and use of inviolable quotes to guarantee that attestation tokens are only provided to expected, and trusted, entities for requesting and/or processing sensitive/confidential data and information.

Prior solutions at best utilize less secure communication session with data storages, and fail to address scenarios in which bad actors have access to system/network hardware, or have obtained stolen certificates or generated unauthorized certificate copies. In contrast, the embodiments herein utilize secure computing system hardware to generate credentials that cannot be spoofed which enables data/information protection above and beyond any prior solutions: secure enclaves in which inviolable quotes that are required to obtain attestation tokens are generated, which prove the token requestor is authentic, and signed digital certificates provided with API calls for data/information that identify expected, and trusted, API call originators, are both required to obtain the data/information which is further re-encrypted prior to fulfilling user's requests, and this enables multiple security layers and checks in the data request chain that prevent unauthorized access. These and other improvements described herein for secure authentication using attestation tokens and inviolable quotes to validate request origins were previously not available for hardware- and software-based platforms and networks, including cloud-based platforms, much less for the specific system implementations, organizations, and architectures in the embodiments described herein.

The additional examples and embodiments described in this Section may be applicable to examples disclosed in any other Section or subsection of this disclosure.

Embodiments in this description provide for systems, devices, and methods for secure authentication using attestation tokens and inviolable quotes to validate request origins. For instance, such a system is described herein. The system includes a secure enclave that includes an encrypted memory, a program memory storing program code, and a processing system comprising one or more processors configured to receive the program code from the program memory and, in response to at least receiving the program code, to perform operations. The operations include to: generate a signed digital certificate that includes a public key from a key pair that is generated by the secure enclave, and a secure quote that is generated in the encrypted memory and that includes an identifier of the secure enclave and a hash value of the public key; receive an attestation token, from a trusted token provider, that is based at least on the hash value of the public key included in the secure quote; receive a request from a requestor for confidential data; place an application programming interface (API) call that includes the signed digital certificate and the attestation token to a data storage that persists the confidential data in a first encrypted state, the API call establishing a secure communication session between the data storage and the secure enclave based at least on the signed digital certificate included therewith; and receive from the data storage via the secure communication session, based at least on a trust determination for the secure enclave made by the data storage, an API response that includes the confidential information to fulfill the request from the requestor In an embodiment, the system includes the trusted token provider that is configured to: receive the secure quote and the signed digital certificate; generate the attestation token based at least on said receiving the secure quote and the digital signed certificate; and provide the attestation token to the secure enclave.

In an embodiment of the system, the trusted token provider, to update stored signing certificates, is configured to: locally-store a signing certificate as part of the stored signing certificates; receive a certificate request from the data storage for one or more of the stored signing certificates; and provide the one or more of the stored signing certificates, which include the signing certificate, to the data storage responsive to the certificate request.

In an embodiment of the system, the trust determination is performed by the data storage and includes determining that the secure enclave is a trusted source for the API call based at least on: a validation of a signature of the attestation token against the signing certificate provided by the trusted token provider; and a validation of the signed digital certificate provided in the API call.

In an embodiment of the system, the trusted token provider is configured to update the stored signing certificates responsive to an update request from the data storage, the update request being based on the signing certificate of the attestation token in the API call being unrecognized at the data storage.

In an embodiment of the system, the processing system, in response to at least receiving the program code, is further configured to: provide the confidential information in the first encrypted state to the encrypted memory that includes a private key of the key pair; receive the confidential information in a second encrypted state from the encrypted memory; and provide the confidential information in the second encrypted state to the requestor as fulfillment of the request. In the embodiment, the encrypted memory is configured to prevent access to both decrypting operations and encrypting operations that utilize the private key.

In an embodiment of the system, the secure enclave and the trusted token provider comprise a cloud-based platform; the data storage comprises an on-premise computing device outside of the cloud-based platform; and the secure communication session is a mutual transport layer security session via hyper-text transfer protocol (HTTP).

A method performed utilizing a secure enclave of a processing system is also described herein. The method includes: generating, by the secure enclave, a signed digital certificate that includes: a public key from a key pair that is generated by the secure enclave, and a secure quote that is generated in an encrypted memory of the secure enclave and that includes an identifier of the secure enclave and a hash value of the public key; receiving an attestation token, by the secure enclave and from a trusted token provider, that is based at least on the hash value of the public key included in the secure quote; receiving, by the secure enclave, a request from a requestor for confidential data; placing, by the secure enclave, an application programming interface (API) call that includes the signed digital certificate and the attestation token to a data storage that persists the confidential data in a first encrypted state, the API call establishing a secure communication session between the data storage and the secure enclave based at least on the signed digital certificate included therewith; and receiving, by the secure enclave and from the data storage via the secure communication session, based at least on a trust determination for the secure enclave made by the data storage, an API response that includes the confidential information to fulfill the request from the requestor.

In an embodiment of the method, the processing system further comprises the trusted token provider, and the method further includes: receiving the secure quote and the signed digital certificate; generating the attestation token based at least on said receiving the secure quote and the digital signed certificate; and providing the attestation token to the secure enclave.

In an embodiment, the method further includes: updating, by the trusted token provider, stored signing certificates by: locally-storing a signing certificate as part of the stored signing certificates; receiving a certificate request from the data storage for one or more of the stored signing certificates; and providing the one or more of the stored signing certificates, which include the signing certificate, to the data storage responsive to the certificate request.

In an embodiment, the method further includes: performing the trust determination by the data storage by determining that the secure enclave is a trusted source for the API call based at least on: a validation of a signature of the attestation token against the signing certificate provided by the trusted token provider; and a validation of the signed digital certificate provided in the API call.

In an embodiment of the method, updating the stored signing certificates is performed responsive to an update request from the data storage, the update request being based on the signing certificate of the attestation token in the API call being unrecognized at the data storage.

In an embodiment, the method further includes: providing the confidential information in the first encrypted state to the encrypted memory that includes a private key of the key pair; receiving the confidential information in a second encrypted state from the encrypted memory; and providing the confidential information in the second encrypted state to the requestor as fulfillment of the request; and the encrypted memory is configured to prevent access to both decrypting operations and encrypting operations that utilize the private key.

In an embodiment of the method, the secure enclave and the trusted token provider comprise a cloud-based platform; the data storage comprises an on-premise computing device outside of the cloud-based platform; and the secure communication session is a mutual transport layer security session via hyper-text transfer protocol (HTTP).

At least one computer readable storage medium having program code recorded thereon that, when executed by at least one processing system, perform a method utilizing a secure enclave, is also described. The method includes: generating, by the secure enclave, a signed digital certificate that includes: a public key from a key pair that is generated by the secure enclave, and a secure quote that is generated in an encrypted memory of the secure enclave and that includes an identifier of the secure enclave and a hash value of the public key; receiving an attestation token, by the secure enclave and from a trusted token provider, that is based at least on the hash value of the public key included in the secure quote; receiving, by the secure enclave, a request from a requestor for confidential data; placing, by the secure enclave, an application programming interface (API) call that includes the signed digital certificate and the attestation token to a data storage that persists the confidential data in a first encrypted state, the API call establishing a secure communication session between the data storage and the secure enclave based at least on the signed digital certificate included therewith; and receiving, by the secure enclave and from the data storage via the secure communication session, based at least on a trust determination for the secure enclave made by the data storage, an API response that includes the confidential information to fulfill the request from the requestor.

In an embodiment of the at least one computer readable storage medium, the method further includes: receiving the secure quote and the signed digital certificate; generating the attestation token based at least on said receiving the secure quote and the digital signed certificate; and providing the attestation token to the secure enclave.

In an embodiment of the at least one computer readable storage medium, the method further includes: updating, by the trusted token provider, stored signing certificates by: locally-storing a signing certificate as part of the stored signing certificates; receiving a certificate request from the data storage for one or more of the stored signing certificates; and providing the one or more of the stored signing certificates, which include the signing certificate, to the data storage responsive to the certificate request.

In an embodiment of the at least one computer readable storage medium, the method further includes: performing the trust determination by the data storage by determining that the secure enclave is a trusted source for the API call based at least on: a validation of a signature of the attestation token against the signing certificate provided by the trusted token provider; and a validation of the signing certificate provided in the API call.

In an embodiment of the at least one computer readable storage medium, updating the stored signing certificates in the method is performed responsive to an update request from the data storage, the update request being based on the signing certificate of the attestation token in the API call being unrecognized at the data storage.

In one embodiment of the at least one computer readable storage medium, the method further includes: providing the confidential information in the first encrypted state to the encrypted memory that includes a private key of the key pair; receiving the confidential information in a second encrypted state from the encrypted memory; and providing the confidential information in the second encrypted state to the requestor as fulfillment of the request, where the encrypted memory is configured to prevent access to both decrypting operations and encrypting operations that utilize the private key. In another embodiment of the at least one computer readable storage medium, the secure enclave and the trusted token provider comprise a cloud-based platform, wherein the data storage comprises an on-premise computing device outside of the cloud-based platform, and wherein the secure communication session is a mutual transport layer security session via hyper-text transfer protocol (HTTP).

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system comprising:
a secure enclave that comprises an encrypted memory, a program memory storing program code, and a processing system comprising a processor circuit configured to receive the program code from the program memory and, in response to receiving the program code, to:
  generate a signed digital certificate that comprises:
    a public key from a key pair generated by the secure enclave, and
    a secure quote generated in the encrypted memory and comprising an identifier of the secure enclave and a hash value of the public key;
  receive an attestation token from a trusted token provider, the attestation token based on the hash value of the public key and signed with a signing certificate;
  receive, from a requestor, a request for confidential data; and
  place a first application programming interface (API) call to a data storage that persists the confidential data in a first encrypted state, the first API call comprising the signed digital certificate and the attestation token; and
the trusted token provider configured to:
  receive an update request from the data storage based on the signing certificate of the attestation token in the API call being unrecognized by the data storage;
  update the signing certificate; and
  provide the updated signing certificate to the data storage.

2. The system of claim 1, wherein the trusted token provider is further configured to:
receive the secure quote and the signed digital certificate;
generate the attestation token based on receiving the secure quote and the digital signed certificate; and
provide the attestation token to the secure enclave.

3. The system of claim 1, wherein the trusted token provider is configured to:
locally-store the signing certificate as part of stored signing certificates;
receive a certificate request from the data storage for the signing certificate; and
provide the signing certificate to the data storage.

4. The system of claim 1, wherein the processing system, in response to at least receiving the program code, is further configured to:
place a second API call to the data storage, the second API call comprising the signed digital certificate and an updated attestation token, the updated attestation token signed by the updated signing certificate, the second API call establishing a secure session between the data storage and the secure enclave based on the updated signing certificate; and
receive, from the data storage via the secure communication session and based on a trust determination for the secure enclave made by the data storage, an API response that comprises the confidential information to fulfill the request from the requestor.

5. The system of claim 4, wherein the trust determination is performed by the data storage and includes determining that the secure enclave is a trusted source for the API call based on:
   a validation of a signature of the updated attestation token against the updated signing certificate; and
   a validation of the signed digital certificate.

6. The system of claim 4, wherein:
   the processing system, in response to receiving the program code, is further configured to
      provide the confidential information in the first encrypted state to the encrypted memory that includes a private key of the key pair,
      receive the confidential information in a second encrypted state from the encrypted memory, and
      provide the confidential information in the second encrypted state to the requestor as fulfillment of the request; and
   the encrypted memory is configured to prevent access to both decrypting operations and encrypting operations that utilize the private key.

7. The system of claim 4, wherein:
   the secure enclave and the trusted token provider comprise a cloud-based platform;
   the data storage comprises an on-premise computing device outside of the cloud-based platform; and
   the secure communication session is a mutual transport layer security session via hyper-text transfer protocol (HTTP).

8. A method performed utilizing a secure enclave and a trusted token provider of a processing system, the method comprising:
   generating, by the secure enclave, a signed digital certificate comprising:
      a public key from a key pair generated by the secure enclave, and
      a secure quote generated in an encrypted memory of the secure enclave and comprising an identifier of the secure enclave and a hash value of the public key;
   receiving an attestation token by the secure enclave and from the trusted token provider, the attestation token based on the hash value of the public key and signed with a signing certificate;
   receiving, by the secure enclave and from a requestor, a request for confidential data;
   placing, by the secure enclave, a first application programming interface (API) call to a data storage that persists the confidential data in a first encrypted state, the API call comprising the signed digital certificate and the attestation token;
   receiving, by the trusted token provider and from the data storage, an update request based on the signing certificate of the attestation token in the API call being unrecognized by the data storage;
   updating, by the trusted token provider, the signing certificate; and
   providing, by the trusted token provider, the updated signing certificate to the data storage.

9. The method of claim 8, further comprising:
   receiving, by the trusted token provider, the secure quote and the signed digital certificate;
   generating, by the trusted token provider, the attestation token based on said receiving the secure quote and the digital signed certificate; and
   providing, by the trusted token provider, the attestation token to the secure enclave.

10. The method of claim 8, further comprising:
    updating, by the trusted token provider, stored signing certificates by:
       locally-storing the signing certificate as part of the stored signing certificates;
       receiving a certificate request from the data storage for the signing certificate; and
       providing the signing certificate to the data storage.

11. The method of claim 8, further comprising:
    placing, by the secure enclave, a second API call to the data storage, the second API call comprising the signed digital certificate and an updated attestation token, the updated attestation token signed by the updated signing certificate, the second API call establishing a secure session between the data storage and the secure enclave based on the updated signing certificate; and
    receiving, by the secure enclave and from the data storage via the secure communication session and based on a trust determination for the secure enclave made by the data storage, an API response that comprises the confidential information to fulfill the request from the requestor.

12. The method of claim 11, wherein the data storage makes the trust determination by determining that the secure enclave is a trusted source for the API call based on:
    a validation of a signature of the updated attestation token against the updated signing certificate; and
    a validation of the signed digital certificate.

13. The method of claim 11, further comprising:
    providing, by the secure enclave, the confidential information in the first encrypted state to the encrypted memory that includes a private key of the key pair,
    receiving, by the secure enclave, the confidential information in a second encrypted state from the encrypted memory, and
    providing, by the secure enclave, the confidential information in the second encrypted state to the requestor as fulfillment of the request; and
    wherein the encrypted memory is configured to prevent access to both decrypting operations and encrypting operations that utilize the private key.

14. The method of claim 11, wherein the secure enclave and the trusted token provider comprise a cloud-based platform;
    wherein the data storage comprises an on-premise computing device outside of the cloud-based platform; and
    wherein the secure communication session is a mutual transport layer security session via hyper-text transfer protocol (HTTP).

15. A computer readable storage medium having program code recorded thereon that, when executed by a processing system, perform a method utilizing a secure enclave and a trusted token provider, the method comprising:
    generating, by the secure enclave, a signed digital certificate comprising:
       a public key from a key pair generated by the secure enclave, and
       a secure quote generated in an encrypted memory of the secure enclave and comprising an identifier of the secure enclave and a hash value of the public key;
    receiving an attestation token by the secure enclave and from the trusted token provider, the attestation token based on the hash value of the public key and signed with a signing certificate;
    receiving, by the secure enclave and from a requestor, a request for confidential data;

placing, by the secure enclave, a first application programming interface (API) call to a data storage that persists the confidential data in a first encrypted state, the API call comprising the signed digital certificate and the attestation token;

receiving, by the trusted token provider and from the data storage, an update request based on the signing certificate of the attestation token in the API call being unrecognized by the data storage;

updating, by the trusted token provider, the signing certificate; and providing, by the trusted token provider, the updated signing certificate to the data storage.

16. The computer readable storage medium of claim 15, wherein the method further comprises:

receiving, by the trusted token provider, the secure quote and the signed digital certificate;

generate, by the trusted token provider, the attestation token based on said receiving the secure quote and the digital signed certificate; and providing, by the trusted token provider, the attestation token to the secure enclave.

17. The computer readable storage medium of claim 15, wherein the method further comprises:

updating, by the trusted token provider, stored signing certificates by:

locally-storing the signing certificate as part of the stored signing certificates;

receiving a certificate request from the data storage for the signing certificate; and providing the signing certificate to the data storage.

18. The computer readable storage medium of claim 15, wherein the method further comprises:

placing, by the secure enclave, a second API call to the data storage, the second API call comprising the signed digital certificate and an updated attestation token, the updated attestation token signed by the updated signing certificate, the second API call establishing a secure session between the data storage and the secure enclave based on the updated signing certificate; and receiving, by the secure enclave and from the data storage via the secure communication session and based on a trust determination for the secure enclave made by the data storage, an API response that comprises the confidential information to fulfill the request from the requestor.

19. The computer readable storage medium of claim 18, wherein the data storage makes the the trust determination by determining that the secure enclave is a trusted source for the API call based on:

a validation of a signature of the updated attestation token against the updated signing certificate; and a validation of the signing certificate.

20. The computer readable storage medium of claim 18, wherein:

the method further comprises:

providing, by the secure enclave, the confidential information in the first encrypted state to the encrypted memory that includes a private key of the key pair, receiving, by the secure enclave, the confidential information in a second encrypted state from the encrypted memory, and providing, by the secure enclave, the confidential information in the second encrypted state to the requestor as fulfillment of the request, wherein the encrypted memory is configured to prevent access to both decrypting operations and encrypting operations that utilize the private key; or the secure enclave and the trusted token provider comprise a cloud-based platform, wherein the data storage comprises an on-premise computing device outside of the cloud-based platform, and wherein the secure communication session is a mutual transport layer security session via hyper-text transfer protocol (HTTP).

\* \* \* \* \*